(12) United States Patent  
Srinivasan et al.

(10) Patent No.: US 7,904,880 B2  
(45) Date of Patent: Mar. 8, 2011

(54) GENERATING AND BINDING WEB SERVICES TO APPLICATION COMPONENTS

(75) Inventors: Ashok Srinivasan, Woodinville, WA (US); Jeff Comstock, Issaquah, WA (US); Vinod Kumar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1245 days.

(21) Appl. No.: 11/378,171

(22) Filed: Mar. 17, 2006

(65) Prior Publication Data

US 2007/0220115 A1      Sep. 20, 2007

(51) Int. Cl.  
G06F 9/44         (2006.01)

(52) U.S. Cl. ........................................................ 717/108

(58) Field of Classification Search .................. 717/106, 717/107, 108; 709/206, 218, 217, 220, 229, 709/246, 223; 719/310, 315, 328, 330; 705/36 R; 707/102; 713/170; 715/227–234  
See application file for complete search history.

(56) References Cited

U.S. PATENT DOCUMENTS

| | | | |
|---|---|---|---|
| 7,000,238 B2 * | 2/2006 | Nadler et al. | 719/330 |
| 7,130,891 B2 * | 10/2006 | Bernardin et al. | 709/218 |
| 7,596,523 B2 * | 9/2009 | Sobel et al. | 705/36 R |
| 7,640,348 B2 * | 12/2009 | Atwal et al. | 709/229 |
| 7,698,398 B1 * | 4/2010 | Lai | 709/223 |
| 2003/0167277 A1 * | 9/2003 | Hejlsberg et al. | 707/102 |
| 2005/0044197 A1 * | 2/2005 | Lai | 709/223 |
| 2005/0198154 A1 * | 9/2005 | Xie et al. | 709/206 |

OTHER PUBLICATIONS

Thompson, "Using XML Web Services to Communicate with Microsoft Axapta," http://www.msdn.microsoft.com/library/default.asp?url=/library/en-us/dnaxap/html/axp_usingwebserv.asp, Jan. 2005.

Thompson, "Integrating Microsoft Axapta Using the Axapta Business Connector and Visual Basic .NET," http://www.msdn.microsoft.com/library/default.asp?url=/library/en-us/dnaxap/html/vb_axapta.asp, Sep. 2004.

http://www.theserverside.net/articles/content/soapextensions/soapextensions.html, Aug. 19, 2004, pp. 1-8.

* cited by examiner

*Primary Examiner* — Tuan Anh Vu  
(74) *Attorney, Agent, or Firm* — Theodore M. Magee; Westman, Champlin & Kelly, P.A.

(57) ABSTRACT

For each of a set of business application classes on an application server, a web service class consisting of a separate web service method for each of a set of actions is generated. Each web service method contains a call to an interface web service method stored on a web server. The interface web service method is capable of calling a method on the application server. Once generated, the web service classes are compiled into an assembly and are stored on the web server.

7 Claims, 11 Drawing Sheets

GENERATING AND BINDING WEB SERVICES TO APPLICATION COMPONENTS

BACKGROUND

Distributed computing systems execute methods that are distributed across multiple computing devices. In early systems, proprietary protocols were used to communicate between the distributed components. This limited the reuse of many components. To overcome this, web services were created which use a standard eXtensible Markup Language (XML)-based communication platform known as SOAP (Simple Object Access Protocol) together with standard formats for describing the component and for registering the component. By using this standardized communication and publication system, components residing on different computers and different computing platforms become interoperable and loosely coupled such that code running on one platform can utilize methods exposed on another platform on another machine.

Most application platforms were developed prior to the emergence of web services. As a result, the methods in those applications were not available to code running on other platforms or machines.

To overcome this, some designers have manually written web service shells that provide a standard web services interface for remote code so that the remote code can invoke the logic in the applications. Writing such web service shells is time consuming since a separate web service method must be written for each application method. In addition, writing such web service shells requires additional expertise in the formation of web services methods and as a result is difficult for programmers who are familiar with coding for a particular application but are not familiar with the coding for web services.

The discussion above is merely provided for general background information and is not intended to be used as an aid in determining the scope of the claimed subject matter.

SUMMARY

For each of a set of business application classes on an application server, a web service class consisting of a separate web service method for each of a set of actions is generated. Each web service method contains a call to an interface web service method stored on a web server. The interface web service method is capable of calling a method on the application server. Once generated, the web service classes are compiled into an assembly and are stored on the web server.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
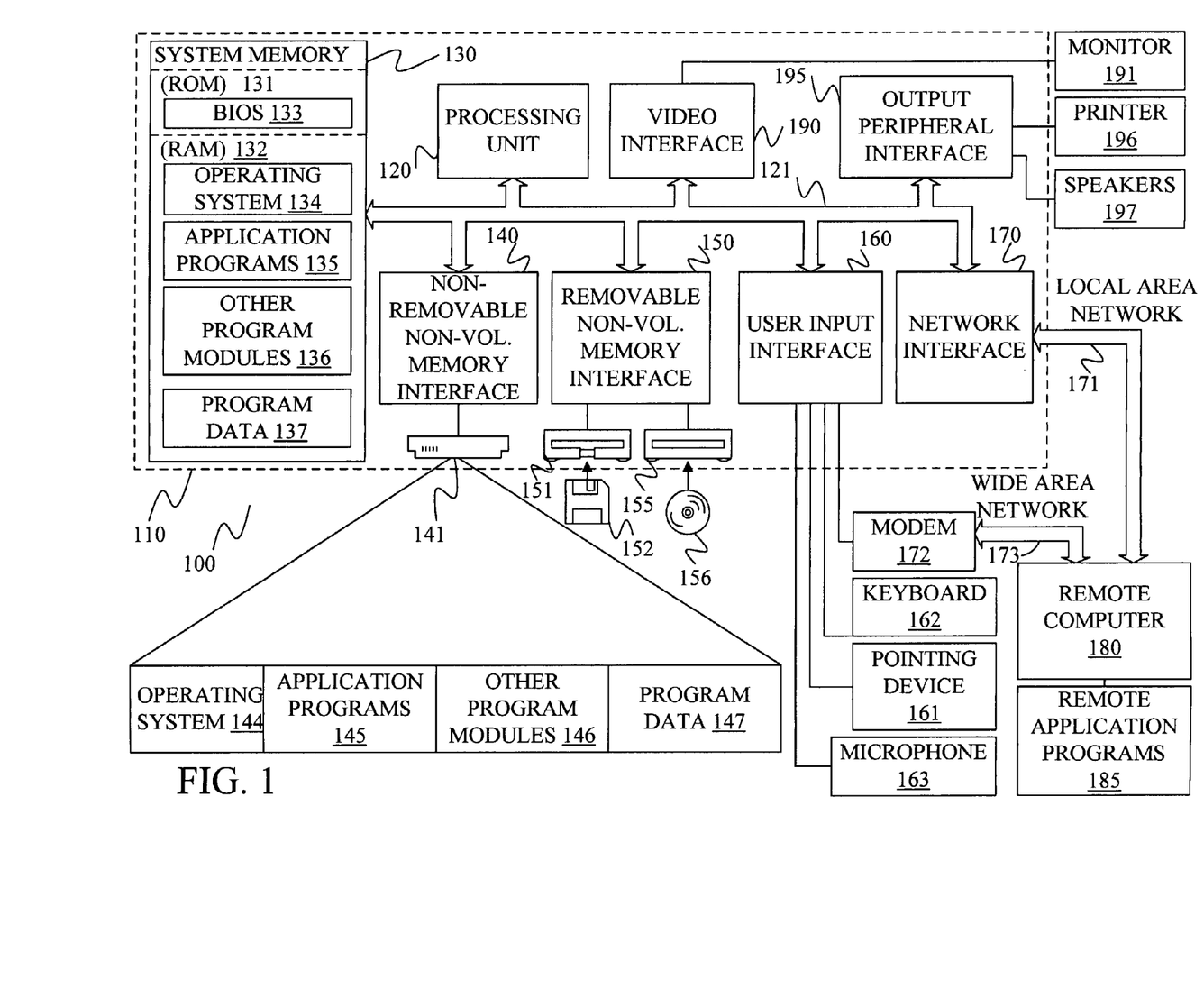
FIG. 1 is a block diagram of one computing environment in which some embodiments may be practiced.

FIG. 1 illustrates an example of a suitable computing system environment 100 on which embodiments may be implemented. The computing system environment 100 is only one example of a suitable computing environment and is not intended to suggest any limitation as to the scope of use or functionality of the claimed subject matter. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
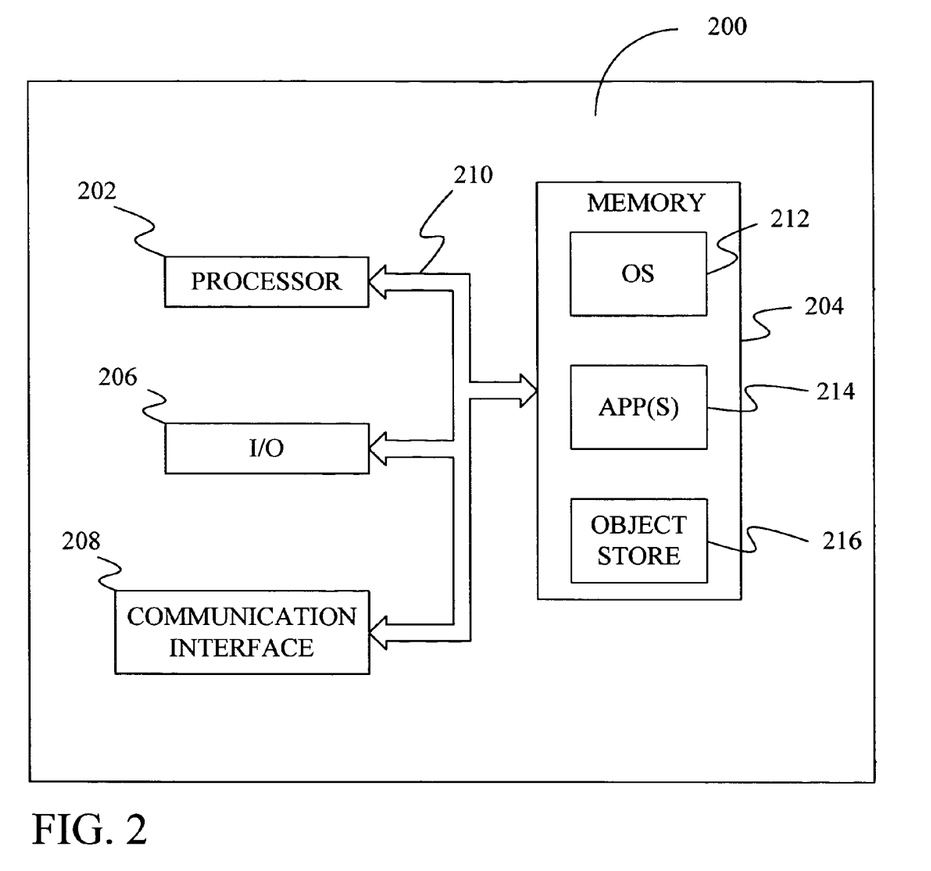
FIG. 2 is a block diagram of an alternative computing environment in which some embodiments may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200.

Figure 3:
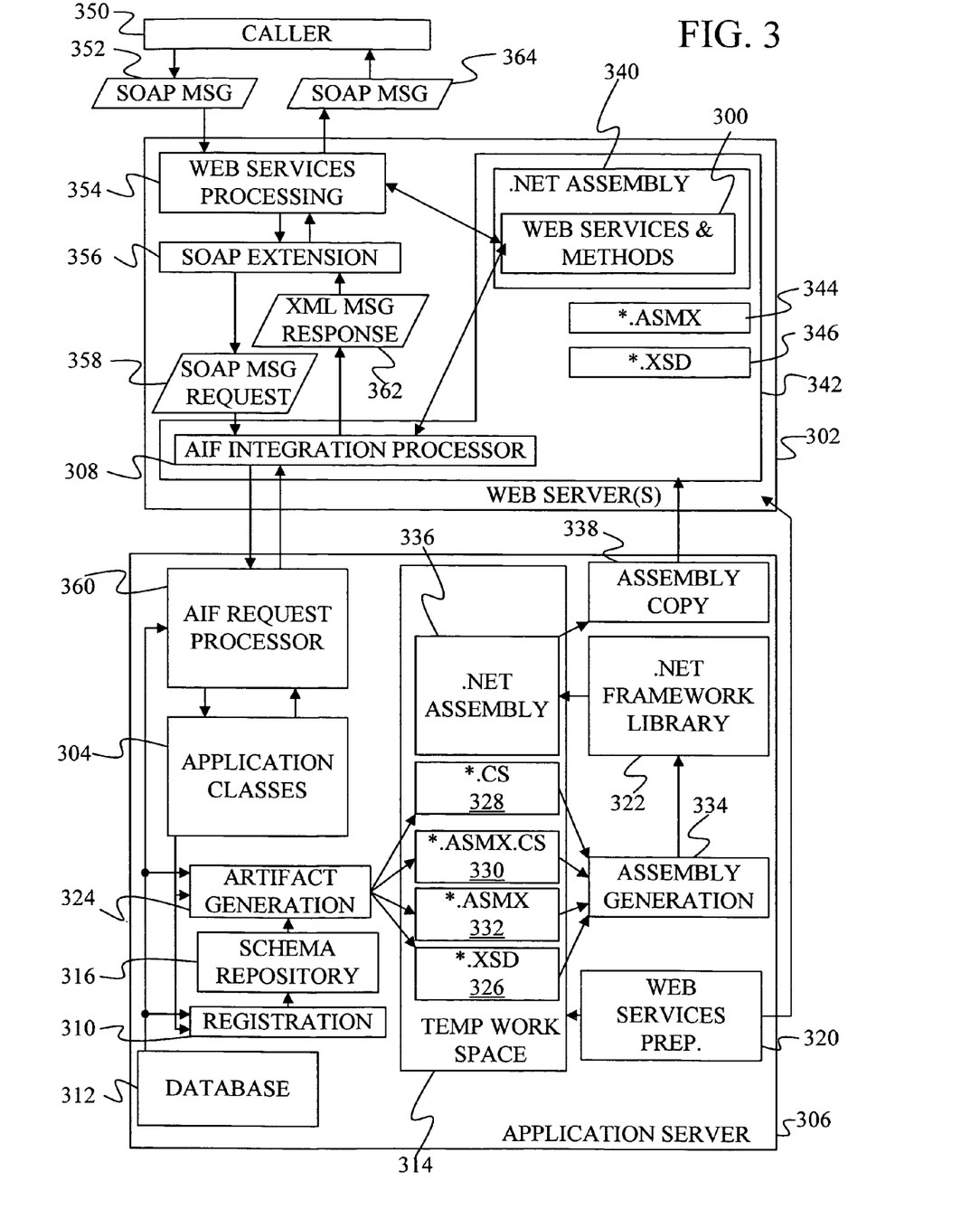
FIG. 3 is a block diagram of elements used to form web services under one embodiment.
Figure 4:
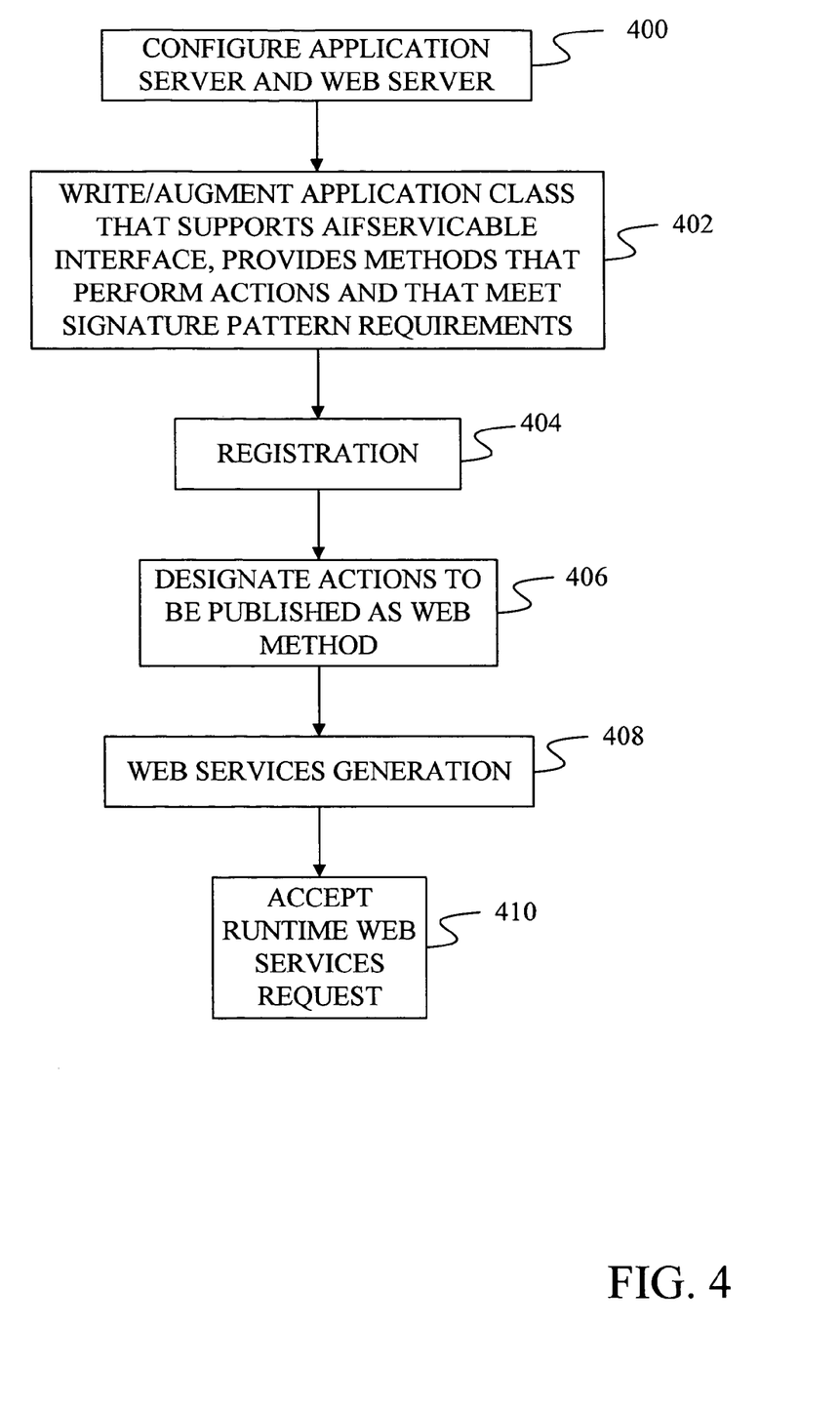
FIG. 4 is a flow diagram for creating web services from application methods under one embodiment.

As shown in the block diagram of FIG. 3, embodiments provide a mechanism for creating, publishing and utilizing web services 300 on a web server 302 based on application classes 304 on an application server 306. FIG. 4 provides a flow diagram of a method for generating, publishing and using the web services 300.

In step 400 of FIG. 4, application server 306 and web server 302 are configured. Configuring web server 302 involves finding a virtual directory 342 and installing an Aif integration processor 308 in the virtual directory. Although a single web server 302 is shown in FIG. 3, the web services may be distributed across a plurality of web servers. In such cases, Aif integration processor 308 must be placed in a virtual directory in each web server. AIF integration processor 308 handles communications between web server 302 and application server 306 as discussed more completely below.

The web servers are then configured to grant access to the virtual directory to application server 306. This access includes read access, write access and delete access to allow application server 306 to store and remove .NET assemblies and other files in virtual directory 342. Application server 306 is configured to designate which web servers the web services are to be placed upon.

Figure 5:
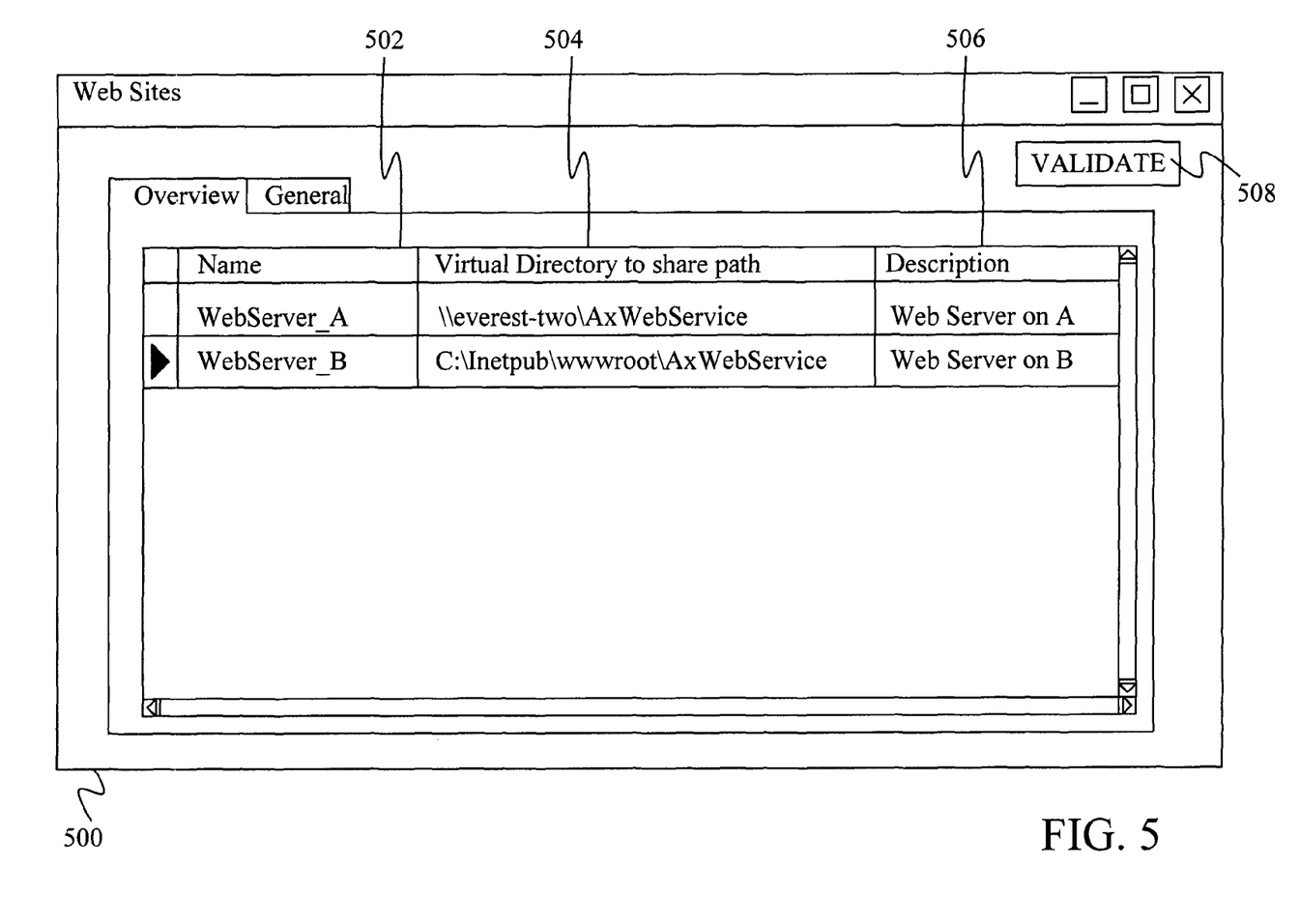
FIG. 5 is a user interface for selecting web servers to copy generated artifacts.

FIG. 5 provides an example user interface 500 in which an administrator can designate the name 502, virtual directory path 504 and description 506 for the web servers where the web services are to be stored. After entering the name, virtual directory share path and description, the administrator presses the validate button 508. This invokes a validation routine that ensures that the share path corresponds to a virtual directory in a web server and that the application server has read, write and delete access to the virtual directory.

Once the servers have been configured, application classes 304 are written or augmented at step 402 so that the classes support the AIFSERVICEABLE interface and so that the classes provide methods for performing one or more actions where the methods have a method signature pattern that matches a template signature discussed more fully below. In some embodiments, an action is an operation performed on an application document such as "receive", "send", or "query".

The AIFSERVICEABLE interface includes four methods that must be implemented by any application class that is to be exposed as a web service. These four methods include:

getName( )—this method returns the name of a document, which must match the root element name in the document's XML schema. This name is not localized. In other words, it does not change depending on the language set for the computer.

getLabel( )—this method returns a label for the document/class. This is a user-friendly name for the document/class and is localized.

getSchema( )—this method returns an XML schema representing the document or class.

getActionList( )—this method generates a collection of AifActionInfo objects. Each AifActionInfo object provides information on an action performed by a method in the document/class that is to be exposed as a web method. The AifActionInfo class contains the following parameters:

parmActionId—this is an internal ID for an action that a method performs. It is used in code to refer to the action and therefore must be unique in the namespace.

parmActionType—this designates the type of action. There are a limited number of action types each with a specific method signature as discussed more fully below.

parmLabel—this is a displayable name for the action and is only used for user interfaces.

parmExternalName—this is the name of the action that will be exposed on the web service. This name can be different than the name of the method in the application class that performs the action. This name must be a valid web service method name.

parmMethodName—the name of the method in the application class that performs this action.

parmDescription—a description of the action that is used in the user interface and is used as the web service method description.

parmDisplayMenuItemName( )—this is the menu item ID of the configuration screen that will be invoked by an Endpoint Action Policy form.

Under one embodiment, there are six action types. These types include:

SendDocument—which returns a document identified by attributes listed in a parameter list.

SendDocumentList—which sends a list of documents that meet criteria in the parameter list.

ReceiveDocument—which creates a document based on information in the parameters and returns an entity key to the document.

ReceiveDocumentList—which creates a set of documents based on a collection of document information and returns a list of entity keys.

QueryEntityKeys—which queries a table for a particular record and returns an entity key list for each record that matches the query criteria.

QueryDocuments—which returns a document that matches a set of query criteria.

Each of these action types is associated with a method signature pattern that consists of the class type to be returned by the method that implements the action and an ordered list of parameter types that the method takes as input. Specifically, the six action types have the following signature patterns:

| Action Type | Interface |
| --- | --- |
| SendDocument | AifDocumentXML < sendMethodName ><br>(AifEntityKey entityKey,<br>  AifSchemaInfo xsdInfo,<br>  AifEndpointActionPolicyInfo actionPolicyInfo,<br>  AifConstraintList constraintList,<br>  AifPropertyBag propertyBag); |
| SendDocumentList | AifDocumentXML < sendMethodName ><br>( AifEntityKeyList entityKeyList,<br>  AifSchemaInfo xsdInfo,<br>  AifEndpointActionPolicyInfo actionPolicyInfo,<br>  AifConstraintListCollection constraintListCollection,<br>  AifPropertyBag propertyBag); |
| ReceiveDocument | AifEntityKey <createMethodName><br>( AifDocumentXMLxml,<br>  AifEndpointActionPolicyInfo actionPolicyInfo,<br>  AifConstraintList constraintList); |
| ReceiveDocumentList | AifEntityKeyList <createMethodName><br>( AifDocumentXMLxml,<br>  AifEndpointActionPolicyInfo actionPolicyInfo,<br>  AifConstraintListCollection constraintListCollection); |
| QueryEntityKeys | AifEntityKeyList <queryMethodName><br>( AifQueryCriteria queryCriteria,<br>  AifEndpointActionPolicyInfo actionPolicyInfo); |
| QueryDocuments | AifDocumentXML <queryMethodName><br>( AifQueryCriteria querycriteria<br>  AifSchemaInfo xsdInfo,<br>  AifEndpointActionPolicyInfo actionPolicyInfo,<br>  AifConstraintListCollection constraintListCollection,<br>  AifPropertyBag propertyBag); |

Although six action types are listed above, additional action types may be added as those skilled in the art will recognize. For each action type, a method signature pattern must be provided. The signature patterns allow for parsing of XML documents into the parameters of the method when invoking the application method as discussed further below.

Figure 6:
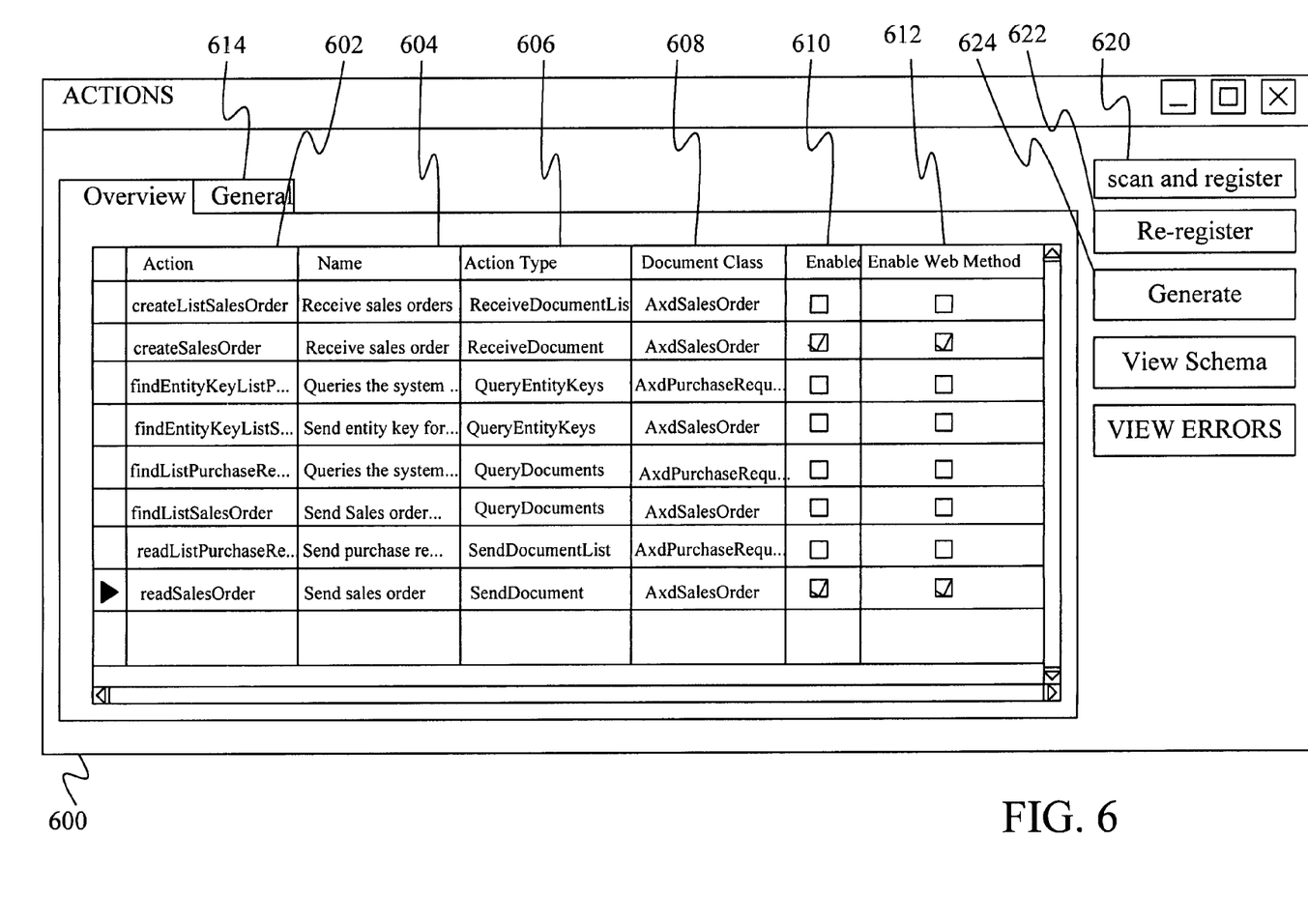
FIG. 6 is a user interface for registering web methods, enabling web methods and generating web methods.
Figure 7:
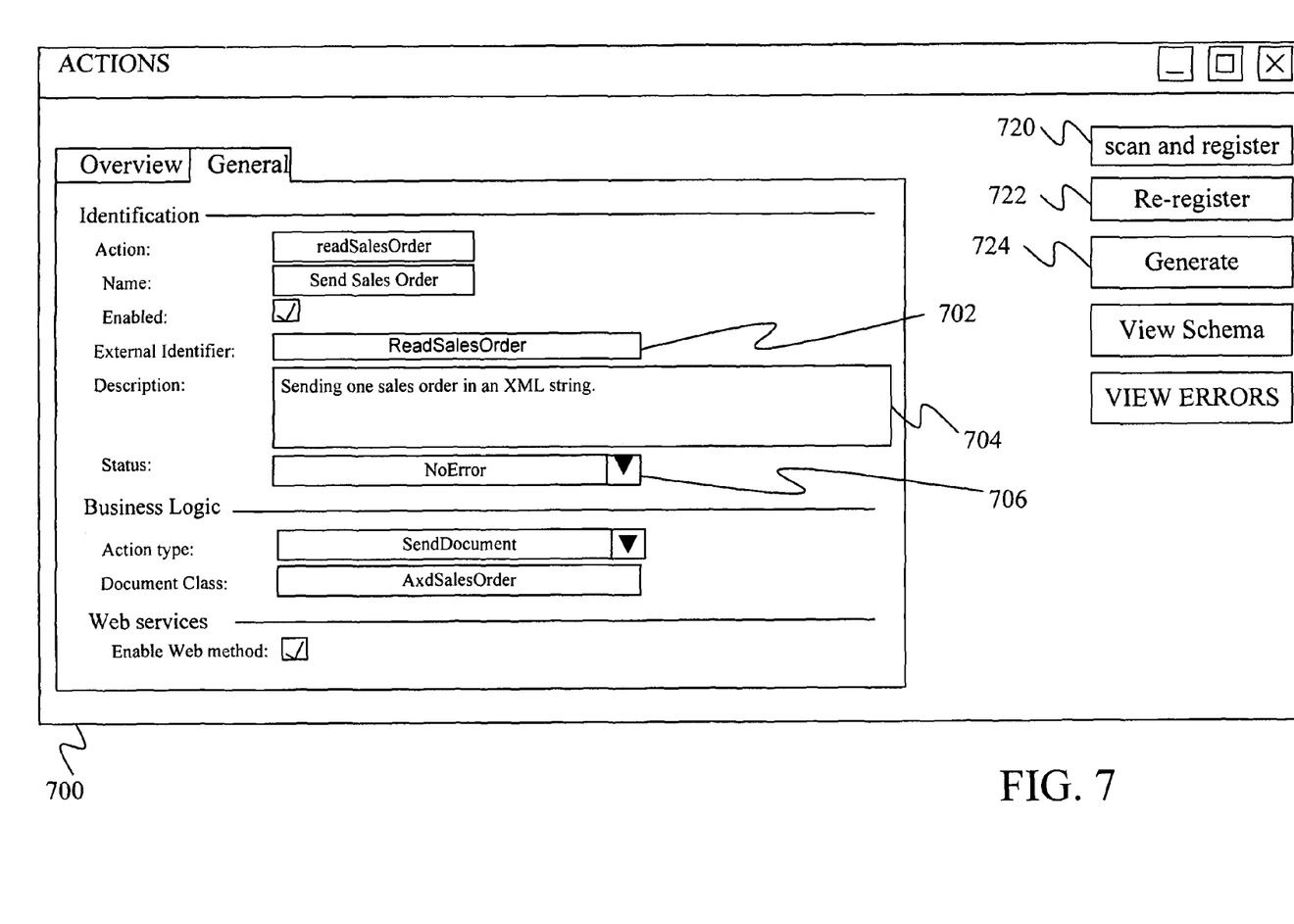
FIG. 7 is a user interface for viewing and setting attributes of web methods.

After the application classes have been written or augmented at step 402, a user interface is used to register actions at step 404. FIGS. 6 and 7 provide example user interfaces 600 and 700 that allow a user to register actions.

Figure 8:
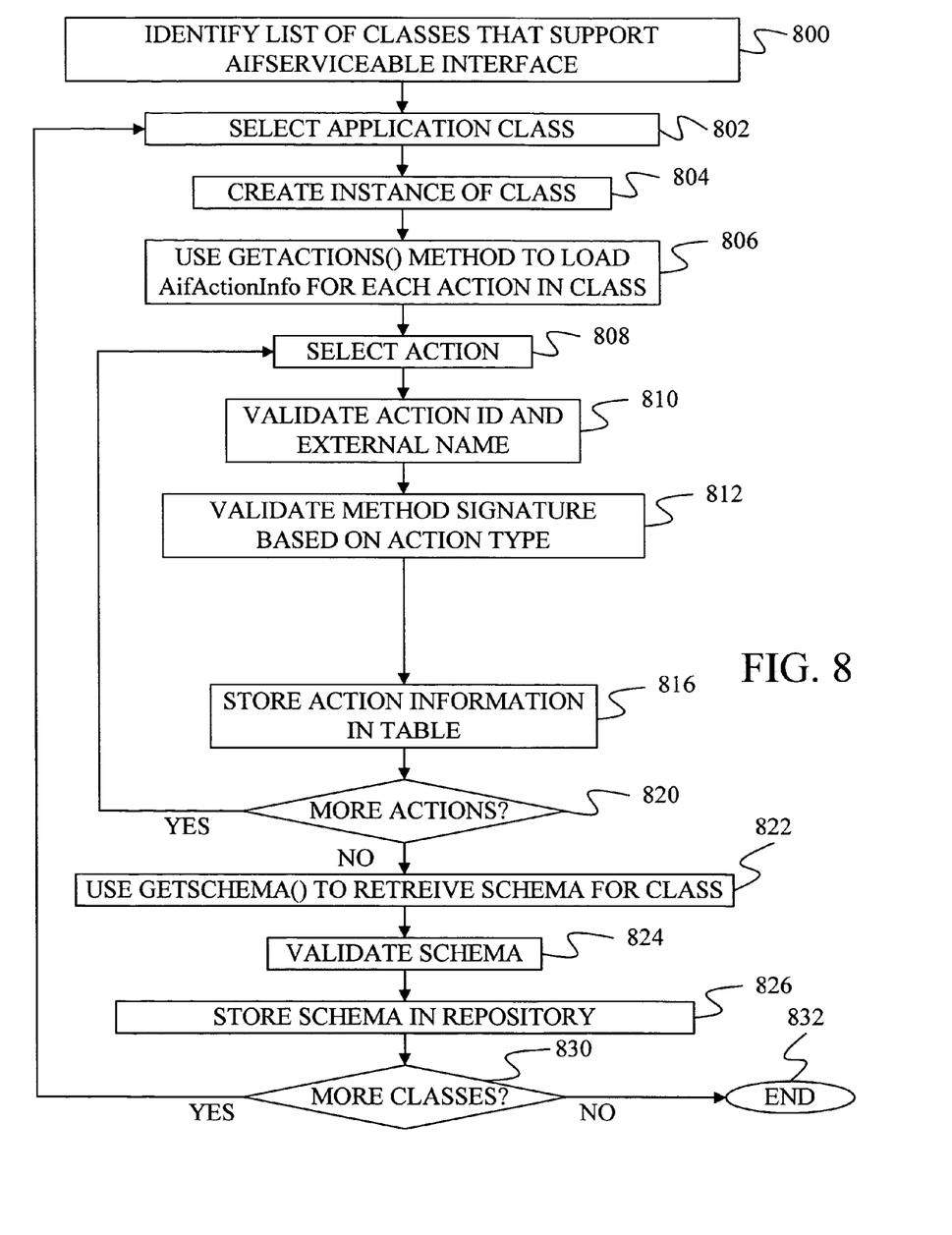
FIG. 8 is a flow diagram of a method for registering an action.

The user initiates registration at step 404 by selecting scan-and-register button 620 or re-register button 622 of FIG. 6 or scan-and-register button 720 or re-register button 722 of FIG. 7. These buttons invoke a method that registers the actions by generating XML schema for each class that has at least one action. FIG. 8 provides a more detailed flow diagram of the process of registration.

Registration is performed by registration unit 310 of FIG. 3, which at step 800 of FIG. 8 identifies a list of classes that support the AifServiceable Interface.

At step 802, one of the classes in the list is selected and an instance of the class is created at step 804. The getActionList( ) method is then invoked on the instantiated class to load the AifActionInfo list by creating an AifActionInfo object for each action in the class.

At step 808, an action in the AifActionInfo list is selected. At step 810, the action ID and the external name returned for the action is validated to ensure that the action ID does not contain spaces and is unique and to ensure that the external name is unique and meets the requirements set for a web service method name.

At step 812, registration unit 310 validates the method signature of the action based on the action type. This is done using the name of the method and reflection to extract the method signature from the class. The extracted method signature is compared to a method signature stored for the action type listed in AifActionInfo. In particular the return type for the method and the data types and their order in the input parameter list of the method are compared to the expected method signature. If the method signature does not match the expected method signature for the action type, an error is thrown for the action and the action is not registered.

At step 816, the information in AIFActionInfo is stored in an AifAction table in database 312.

At step 820, registration unit 310 determines if there are more actions to process. If there are more actions, a new action is selected at step 808. Steps 810-820 are then repeated for the new action.

When there are no more actions for the current class at step 820, the getSchema( ) method exposed by the current class is used to retrieve the schema for the current class at step 822. At step 824, the schema is validated by determining whether the schema is well formed, whether the schema contains a target name space, whether the schema root element name and the name returned by the getName( ) method of the class are the same and whether the schema root element namespace matches the complex type namespace. In addition, the schema is validated to determine if it conforms to the restrictions imposed by a data policy component.

If the schema is not valid, an exception is thrown. If the schema is valid, the schema is stored at step 826 in a schema repository 316.

At step 830, the registration unit determines if there are more classes in the list of identified classes. If there is another class, the process returns to step 802 and selects the next application class 304. Once all of the classes have been processed, a separate schema file will have been stored in repository 316 for each class that has at least one action and the registration process ends at step 832.

The information stored in the AifAction table in database 312 is then used to update the list of actions shown in user interface 600. For each action in the AifAction table, a separate row is created in user interface 600 that contains identifying information for the action. The identifying information is provided in a set of columns and includes the action ID 602, the label name 604, the action type 606 and document class 608 where the method that performs the action is defined. Each row also includes an enable check box 610 and an enable web method check box 612. When checked, enable check box 610 indicates that the action is enabled and may be invoked on the application server. When checked, enable web method check box 612 indicates that the action should be published as a web service method. Enable check box 610 must be checked before enable web method check box 612. For example, in user interface 600, the enable check box and the enable web method check box for the CreateSalesOrder action have been checked. When a user changes one of the check boxes, that information is stored in the AifAction table entry for that action.

The user can view more information for a particular action by selecting the action and then selecting General tab 614. This produces user interface 700 of FIG. 7.

User interface 700 includes much of the same information as found in user interface 600 of FIG. 6. In addition, user interface 700 includes the external identifier 702 for the action, the description 704 of the action and the status 706 of the action. External identifier 702 is the external name for the web method that callers will use to invoke the web method. The external identifier is usually different from the internal name for the action since the internal name is normally chosen from the point of view of the application and the external name is usually chosen so that it makes sense from the point of view of a caller to a web service. For example, if a caller wishes to read a sales order they would call a method named ReadSalesOrder. Internally in the application, this action is named SendSalesOrder, since the application will be sending the sales order to the caller.

Figure 9:
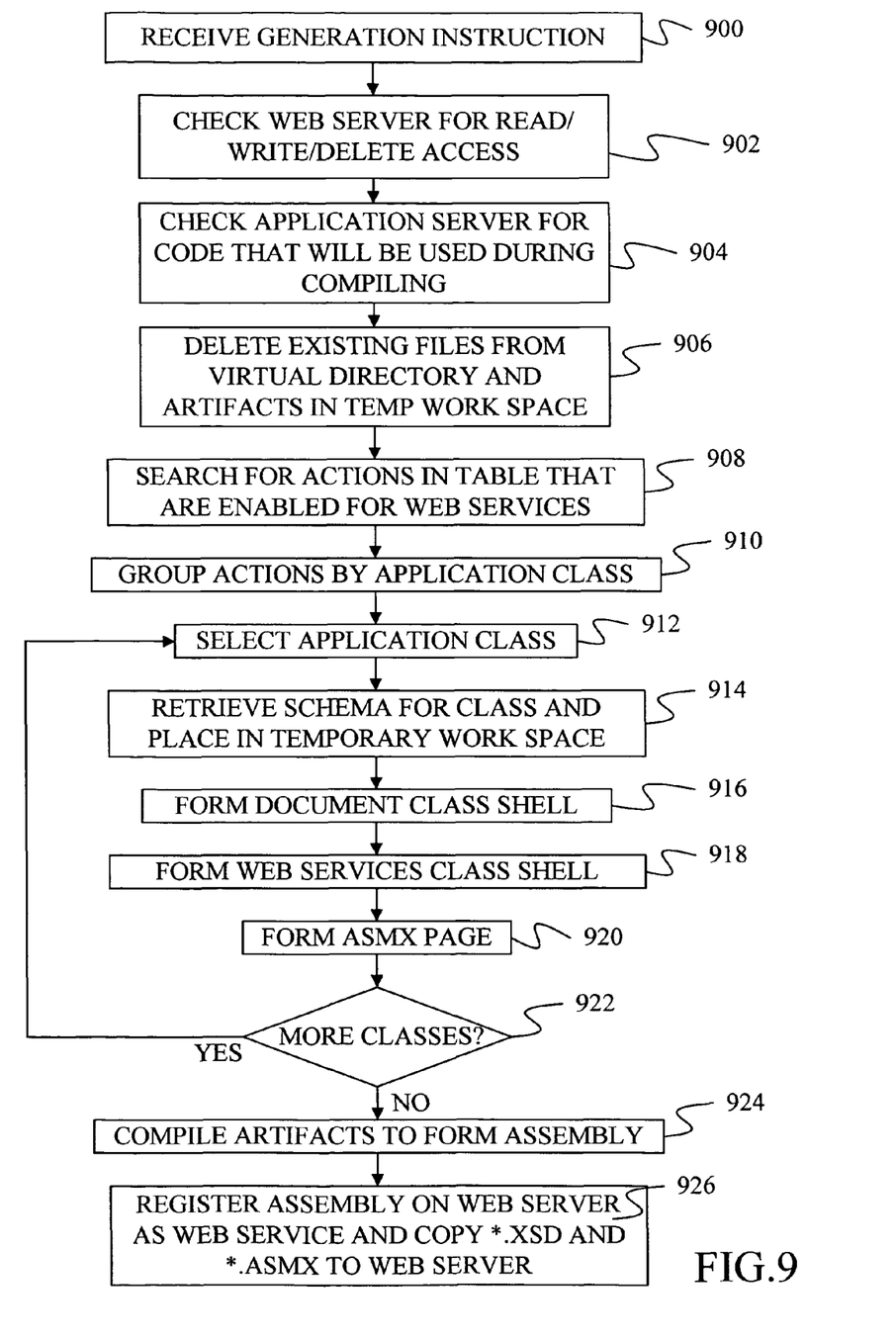
FIG. 9 is a flow diagram of a method for generating web services.

At step 406 of FIG. 4, the developer uses user interface 600 or user interface 700 to designate which actions are to be published as web services using the enable web services check boxes. Web services are then generated at step 408. Under some embodiments, generation of the web services is initiated by the user selecting button 624 or button 724 of FIGS. 6 and 7, respectively. FIG. 9 shows a more detailed flow diagram of the generation process.

At step 900 of FIG. 9, web services preparation 320 of FIG. 3 receives the instruction to generate web services. Web services preparation 320 checks web server 302 at step 902 to ensure that application server 306 has read, write and delete access to virtual directory 342 on web server 302. At step 904, web services preparation 320 checks application server 306 to determine if code used to compile code in the application server as part of web services generation is present on the server. Under one embodiment, this code is found in IntegrationFramework.dll.

At step 906, web services preparation 320 deletes .ASMX, .XSD and any .NET assemblies from the virtual directories on web server 302 as well as generation artifacts such as CSharp files (.CS files) web services C-Sharp files .ASMX.CS, schemas (.xsd files) and .NET assemblies from temporary work space 314.

At step 908, an artifacts generation unit 324 searches for actions in the AifAction table stored in database 312 that are enabled for web services. At step 910, artifact generation unit 324 groups the actions by application class and at step 912 selects an application class.

For the selected class, artifact generation unit 324 retrieves the schema for the class from the schema repository 316 and stores the schema in temporary work space as .XSD file 326 at step 914. At step 916, artifacts generation unit 324 forms a c-sharp document class shell for the application class. Details of forming the document class shell are shown in the flow diagram of FIG. 10.

Figure 10:
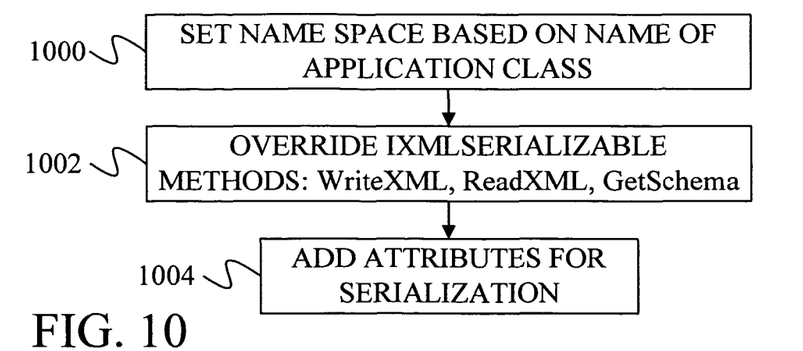
FIG. 10 is a flow diagram of a method for forming a document class shell.

In step 1000 of FIG. 10, the name space for the class shell is set based on the name of the application class. At step 1002, the default IXmlSerializable interface methods writeXml( ), readXml( ) and getSchema( ) are overridden. This is done to prevent the conversion of an inbound XML SOAP message into object types. Normally, when a SOAP message is received, the web server deserializes the parameters in the SOAP document using the default readXml( ) method to form the equivalent object forms of the parameters. In many of the present embodiments, the application classes work with XML data instead of object data. As such, converting the XML data in the inbound SOAP message into object form would only require converting it back from object form to XML form before passing it to the application class. Overriding the writeXml, readXml and getSchema methods of the IXmlSerializable interface causes these methods to return null without creating the object types thereby saving a great deal of memory overhead associated with forming the object types.

Overriding these methods will affect the web services description language (WSDL) that is normally formed from the c-sharp class. To overcome this, the attribute XmlSchemaProvider is set in the document class shell at step 1004, which can be used to provide the schema information to the runtime to produce the WSDL.

Under one embodiment, after performing steps 1000, 1002 and 1004, the document class shell appears as follows:

```
namespace Microsoft.Dynamics.IntegrationFramework.SalesOrderDocument
{
    [System.Xml.Serialization.XmlSchemaProvider("Schema")]
    [System.Xml.Serialization.XmlRootAttribute(Namespace="http://schemas
        .microsoft.com/dynamics/2006/02/documents/SalesOrder",
        IsNullable=false)]
    public class SalesOrder : IXmlSerializable
    {
        public void WriteXml(XmlWriter w)
        {
        return;
        }
        public void ReadXml(XmlReader r)
        {
        return;
        }
        public XmlSchema GetSchema ( )
        {
        return null;
        }
```

```
        public static XmlQualifiedName Schema(XmlSchemaSet xs)
        {
            XmlSerializer schemaSerializer = new
                XmlSerializer(typeof(XmlSchema));
            XmlSchema s = (XmlSchema)schemaSerializer.Deserialize(new
            XmlTextReader(serverUtil.MapPath(null)  +  "\\"   +
            "SalesOrder.xsd"));
            xs.XmlResolver = new XmlUrlResolver( );
            xs.Add(s);
            return   new    XmlQualifiedName("SalesOrder",   "
            http://schemas.microsoft.com/dynamics/2006/02/documents/SalesOrde
            r");
        }
....
....
....
    }
}
```

Note that with the exception of the name space, the name of the class shell and the name of the schema, the document class shell will be the same for all document classes.

The document class shell is stored in temporary work space 314 as class shell 328, which is named with the application class name followed by the .cs extension.

After the document class shell has been formed at step 916 of FIG. 9, a web services class shell is formed at step 918. A method for forming the web services class shell is shown in the flow diagram of FIG. 11.

Figure 11:
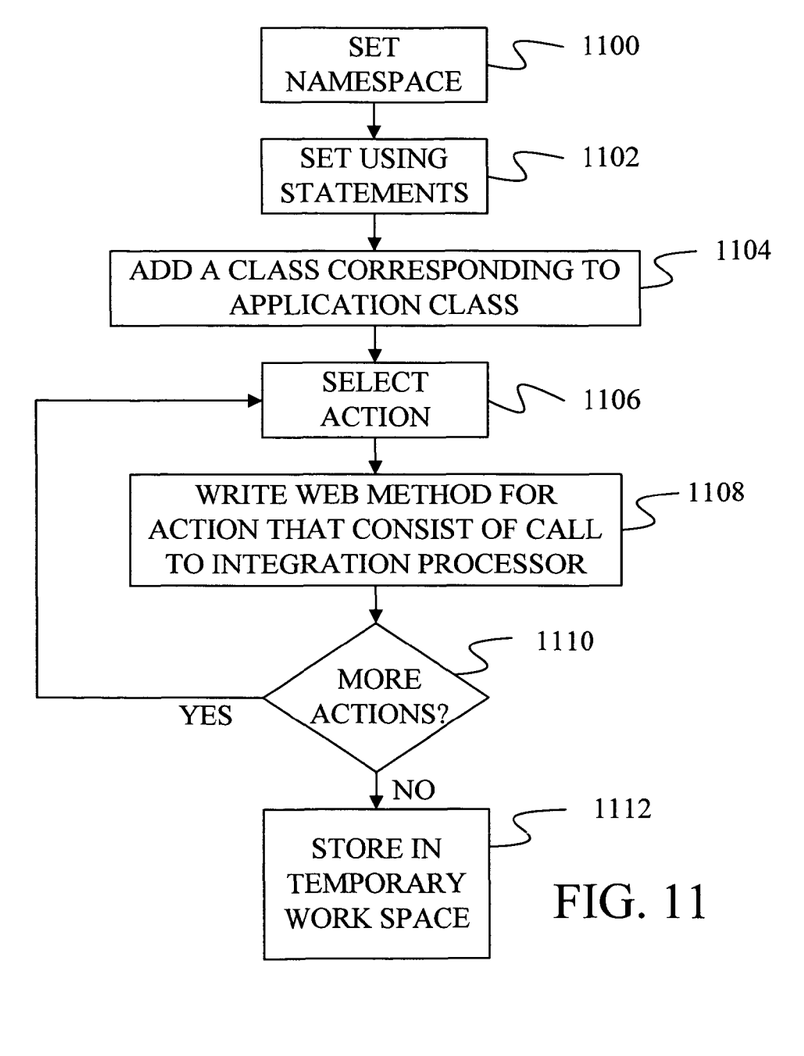
FIG. 11 is a flow diagram of a method for forming a web services class.

At step 1100 of FIG. 11, the name space is set for the web services class. Under one embodiment, the same name space is used for all web services classes. Note that this is different from the document class where a separate name space is provided for each document class to avoid naming conflicts.

At step 1102, "using" statements are added to identify class libraries that are to be included within the web service. Under one embodiment, these include System, System.Xml.Serialization, System.Web.Services, System.Web, and a reference to the document class shell for the class.

At step 1104, a class is written for the application class using the name of the application class followed by "Service" as the name of the class. For instances, for a "SalesOrder" application class, the web services class is named "SalesOrderService".

At step 1106, one of the actions within the business class is selected. At step 1108, a web method is written for the action that consists of a call to AIF integration processor 308. A return statement is also written that returns a value of null. The name of the method is the external name set for the action in the AifAction table. At step 1110, the method determines if there are more actions in the current class. If there are more actions, the process returns to step 1106 to write a new web method for the new action. When there are no further actions at step 1110, the process ends at step 1112. An example of the source code that would be generated through the process of FIG. 11 is shown below for an action of CreateSalesOrder within a class SalesOrderService.

```
namespace Microsoft.Axapta.IntegrationFramework.WebService
{
    using System;
    using System.Xml.Serialization;
    using System.Web.Services;
    using System.Web;
    using Microsoft.Axapta.Integration.WebService.SalesOrderDocument;
    [WebService(Namespace            =
            "http://schemas.microsoft.com/dynamics/2006/02/documents/Sale
            sOrder")]
    [WebServiceBinding(ConformsTo  =  WsiProfiles.BasicProfile1_1,
            EmitConformanceClaims = true)]
    public sealed class SalesOrderService
    {
        [return:XmlElement("EntityKey",
            Namespace="http://schemas.microsoft.com/dynamics/2006/02/docu
            ments/SalesOrder"}]
        [WebMethod(Description="description.")]
        public       EntityKey      CreateSalesOrder(DocumentContext
            DocumentContext,            [XmlElement("SalesOrder",
            Namespace="http://schemas.microsoft.com/dynamics/2006/02/docu
            ments/SalesOrder")] SalesOrder SalesOrder)
        {
            processor.ProcessRequest(DocumentContext,       SalesOrder,
                typeof(SalesOrder));
            return null;
        }
    }
}
```

When there are no more actions for the current class, the web service class shell 330 is stored to temporary work space 314 with the name of the class followed by the .ASMX.CS extension at step 1112.

After the web service class shell has been formed at step 918 of FIG. 9, an ASMX page 332 is formed for the class at step 920 and is stored in temporary work space 314. This page consists of a single line such as:

```
<%@ WebService
Class="Microsoft.Dynamics.IntegrationFramework.WebService.SalesO
    rderService" %>
```

At step 922, artifact generation unit 324 determines if there are more classes. If there are more classes, the process returns to step 912 to select the next class and steps 914, 916, 918 and 920 are repeated for the new class to form a new set of artifacts. Each application class produces a different document class shell 328, web service class shell 330 and ASMX page 332.

When there are no more classes at step 922, an assembly generation unit 334 uses tools in .NET framework library 332 to form a .NET assembly 336 in temporary work space 314. Note that all of the class shells, and web services class shells are compiled together by assembly generation 334 so that a single .NET assembly 336 is formed for all of the classes.

At step 926, assembly copy unit 338 copies .NET assembly 336 as web .NET assembly 340 in virtual directly 342 of web server 302. Assembly copy 338 also copies .ASMX pages 332 and schemas 326 as .ASMX pages 344 and schemas 346 in web server 302.

Figure 12:
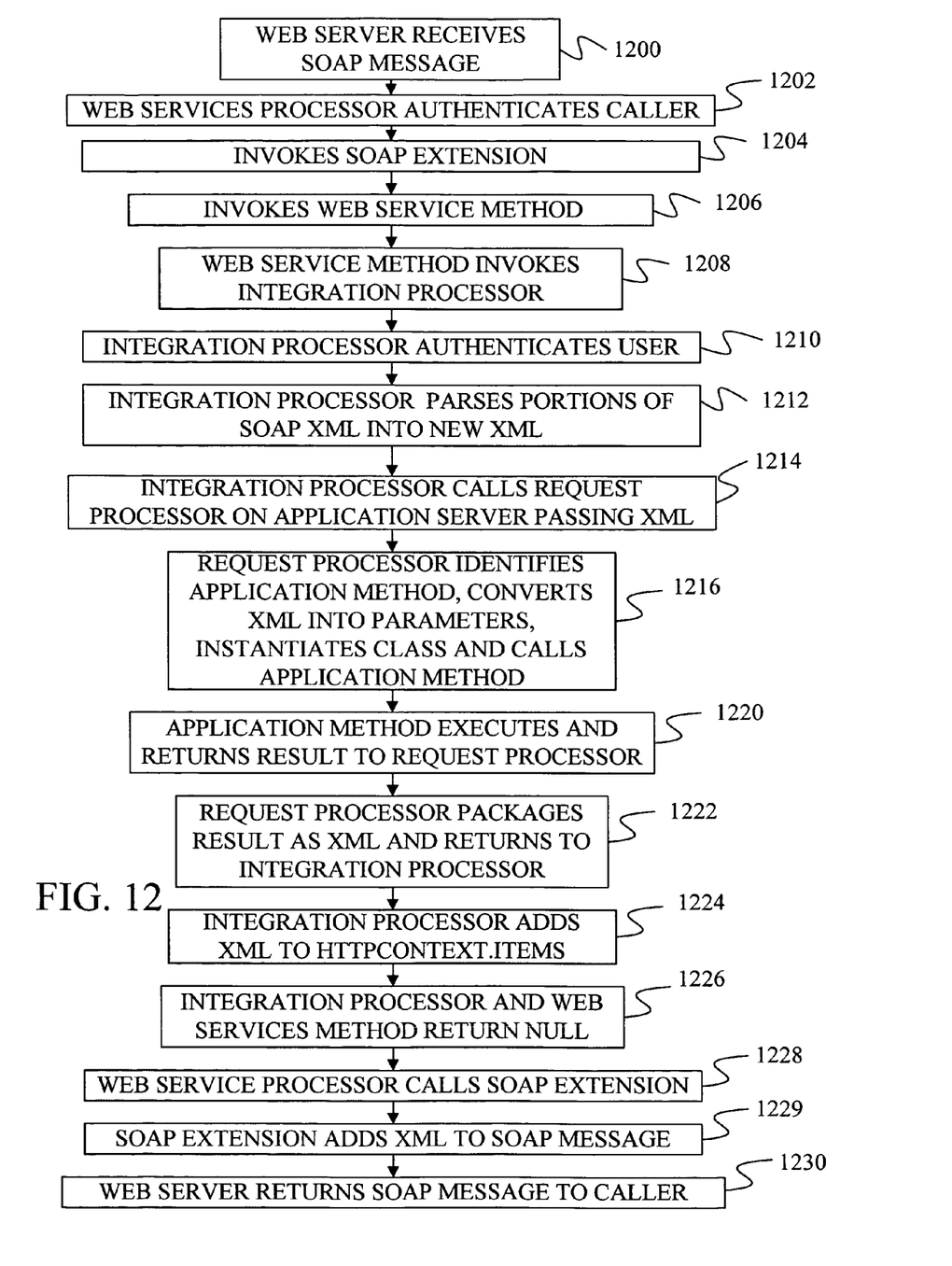
FIG. 12 is a flow diagram of a method of invoking application logic through web services.

Once the web services have been automatically generated as shown in FIG. 9, they may be called by an outside caller 350 by passing a SOAP message 352 to web server 302. FIG. 12 shows the processing of a SOAP message 352 that invokes a web service generated under the flow diagram of FIG. 9.

At step 1200, web server 302 receives an HTTP request with a SOAP document. The SOAP document identifies the web services method and the external name of the action associated with the web services method. At step 1202, a web services processor 354 authenticates caller 350 to determine if it will accept the HTTP request. If the caller is authenticated, web services processor 354 invokes a SOAP extension 356, which has been registered for the web services 300. Under one embodiment, SOAP extension 356 stores the SOAP message without processing it to form SOAP message request 358.

At step 1206, web services processor 354 invokes web services 300 identified in SOAP message 352. At step 1208, web services method 300 invokes AIF integration processor 308. AIF integration processor acts as an interface method between the web services and application classes on application server 306. Once invoked, AIF integration processor authenticates the user who is trying to perform the action at step 1210. This is done by attempting to log into application server 306 using the user's credentials found in SOAP message request 358. If the log on fails, the AIF integration processor 308 stops processing and returns an error message.

If the user is authenticated, integration processor 308 parses SOAP message request 358 at step 1212 to form an AIF XML message document that includes a portion of the information in the SOAP headers and XML information in the payload of the SOAP message that is needed to invoke a method on application server 306. In particular, the XML message includes the external name of the action associated with the web services method.

Under some embodiments the AIF XML message document has the following structure:

```
<Envelope
  xmlns="http://schemas.microsoft.com/dynamics/2006/02/
  documents/Message">
    <Header>
        <MessageId></MessageId>
        <SourceEndpointUser></SourceEndpointUser>
        <SourceEndpoint></SourceEndpoint>
        <DestinationEndpoint></DestinationEndpoint>
        <Action></Action>
        <RequestMessageId></RequestMessageId>
    </Header>
    <Body>
    </Body>
</Envelope>
```

Where "SourceEndpointUser" is the Windows user account of the sender, in the format DOMAIN\USERNAME, "SourceEndpoint" is used to identify the sender of the message, "DestinationEndpoint" is used to determine which account the message is destine for, "Action" is the ExternalAction, not the ActionId, and "Body" will contain an XML structure representing a key to a specific record in a table, a list of keys to records in tables, criteria for searching a table, a document, or an error message.

At step 1214, integration processor 308 invokes AIF request processor 360, which is a method on application server 306 and passes the XML document formed from SOAP message request 358.

At step 1216, AIF request processor 360 identifies the application class and the method associated with the action in the XML message. This is done by looking for the entry for the action in the AifAction table using the external name for the action provided in the XML message provided by integration processor 308. AIF request processor than creates an instance of the application class and maps the data in the XML message into parameters for the method associated with the action. In particular, this mapping is done using the action type for the action and the method signature assigned to that action type to determine how the elements of the XML document should be assigned to the parameters of the method. Once the contents of the XML document have been mapped to parameters for the method, the method in application class 304 is invoked.

At step 1220, the method executes and returns a result to AIF request processor 360. At step 1222, AIF request processor 360 packages the result in an XML format if the returned result is not already in an XML format. The XML document is then returned to AIF integration processor 308 on web server 302.

At step 1224, AIF integration processor 308 adds XML message response 362 from AIF request processor 360 to HTTPContext.items so that it is available to SOAP extensions 356.

At step 1226, AIF integration processor returns a null value to web method 300, which also returns a null value to web services processor 354. At step 1228, web services processor 354 invokes SOAP extension 356, which adds the contents of HTTPContext.items to the return SOAP message prepared by web services processor 354 at step 1229. The SOAP response message 364 is then returned to the caller 350 at step 1230.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-readable medium having computer-executable instructions for performing steps comprising:
   an application server identifying a set of application classes that support a particular interface, using methods in the particular interface to identify methods in the application classes that can be made accessible through web service methods, and adding the identified methods to a list of methods that can be made accessible through web service methods;
   the application server generating a user interface that displays the list of methods that can be made accessible through web service methods and that allows a user to mark which methods in the list are to be accessible through web services;
   the application server receiving through the user interface an indication that a plurality of methods in a plurality of application classes are to be accessible through web service methods based on which methods were marked by the user;
   in response to the indication received through the user interface, the application server performing a plurality of steps comprising:
      for each application class on the application server, the application server generating on the application server a web service class consisting of a separate web service method for each of a set of actions, each web service method containing a call to an integration processor stored on a web server, the integration processor capable of calling a method on the application server;
      the application server forming a single assembly from the plurality of web service classes on the application server; and
      the application server copying the single assembly onto the web server.

2. The computer-readable medium of claim 1 further comprising the application server forming document classes from the application classes, the document classes having methods that override default methods used to deserialize a markup language document.

3. The computer-readable medium of claim 1 wherein the integration processor is capable of calling a request processor method on the application server, the request processor method being capable of instantiating an application class and invoking a method in the application class that is associated with the web service method.

4. The computer-readable medium of claim 3 wherein the request processor method is capable of receiving a markup language document from the integration processor and is capable of parsing the markup language document to assign values to parameters that are passed to the method in the application class.

5. The computer-readable medium of claim 1 wherein generating a web service class further comprises validating a method in the application class to ensure that the method has a desired method signature.

6. The computer-readable medium of claim 5 wherein the method in the application class is associated with an action type and wherein the desired method signature is based on the action type.

7. The computer-readable medium of claim 1 wherein the name of the web service method is different from the name of the method in the application class.

* * * * *